(12) United States Patent
Dong et al.

(10) Patent No.: US 7,773,374 B2
(45) Date of Patent: Aug. 10, 2010

(54) SLIDE MECHANISM FOR SLIDE-TYPE PORTABLE ELECTRONIC DEVICE

(75) Inventors: Shui-Jin Dong, Shenzhen (CN); Yu Zhang, Shenzhen (CN); Chih-Chiang Chang, Shindian (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 145 days.

(21) Appl. No.: 12/233,761

(22) Filed: Sep. 19, 2008

(65) Prior Publication Data

US 2009/0262486 A1 Oct. 22, 2009

(30) Foreign Application Priority Data

Apr. 18, 2008 (CN) .......................... 2008 1 0301204

(51) Int. Cl.
*G06F 1/16* (2006.01)
(52) U.S. Cl. .............................. 361/679.39; 455/575.4; 345/102; 248/688; 360/294.4
(58) Field of Classification Search ............ 361/679.55, 361/807, 679.01, 679.39, 679.33, 679.56, 361/679.4; 455/575.4; 345/8, 102; 248/324, 248/688, 398, 133, 71; 439/157, 630; 360/291.9, 360/294.4; 384/44
See application file for complete search history.

(56) References Cited

U.S. PATENT DOCUMENTS

| 2009/0156274 A1* | 6/2009 | Wang ....................... 455/575.4 |
| 2009/0290302 A1* | 11/2009 | Dong et al. ............ 361/679.55 |
| 2010/0029348 A1* | 2/2010 | Lee et al. .................. 455/575.4 |

* cited by examiner

*Primary Examiner*—Hung V Duong
(74) *Attorney, Agent, or Firm*—Steven M. Reiss

(57) ABSTRACT

A slide mechanism (100) used in portable electronic device (300) is described including a main plate (10), a slide plate (20), two sliders (40), and two guiders (30). The slide plate is installed on the main plate and slidable relative to the main plate. The sliders are securely attached to the slide plate, and the guiders are securely attached to the main plate deformably guiding the sliders to move along it. When the slide plate slides along the main plate, the sliders and the guiders compress with each other, thereby generating deformations therebetween and driving the sliding of the slide plate along the main plate.

16 Claims, 6 Drawing Sheets

SLIDE MECHANISM FOR SLIDE-TYPE PORTABLE ELECTRONIC DEVICE

BACKGROUND

1. Field of the Invention

The present invention generally relates to slide mechanisms and, particularly, to a portable electronic device with two or more housings using a sliding mechanism that allows one housing to slide over another housing in a longitudinal direction.

2. Description of related art

Slide-type portable electronic devices have been increasingly used among diverse designs for portable electronic devices. The slide-type portable electronic device has two housings, of which one slides over the other to open/close the portable electronic device.

A slide mechanism is generally used in the slide-type portable electronic device for driving the sliding between the two housings. However, the slide mechanism is typically complex in structure and usually difficult to assemble within the portable electronic device. As a result of the structural complexity and assembling difficulty, production costs can be high.

Therefore, there is room for improvement within the art.

BRIEF DESCRIPTION OF THE DRAWINGS

Many aspects of the exemplary slide mechanism and a portable electronic device using the slide mechanism can be better understood with reference to the following drawings. These drawings are not necessarily drawn to scale, the emphasis instead being placed upon clearly illustrating the principles of the slide mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
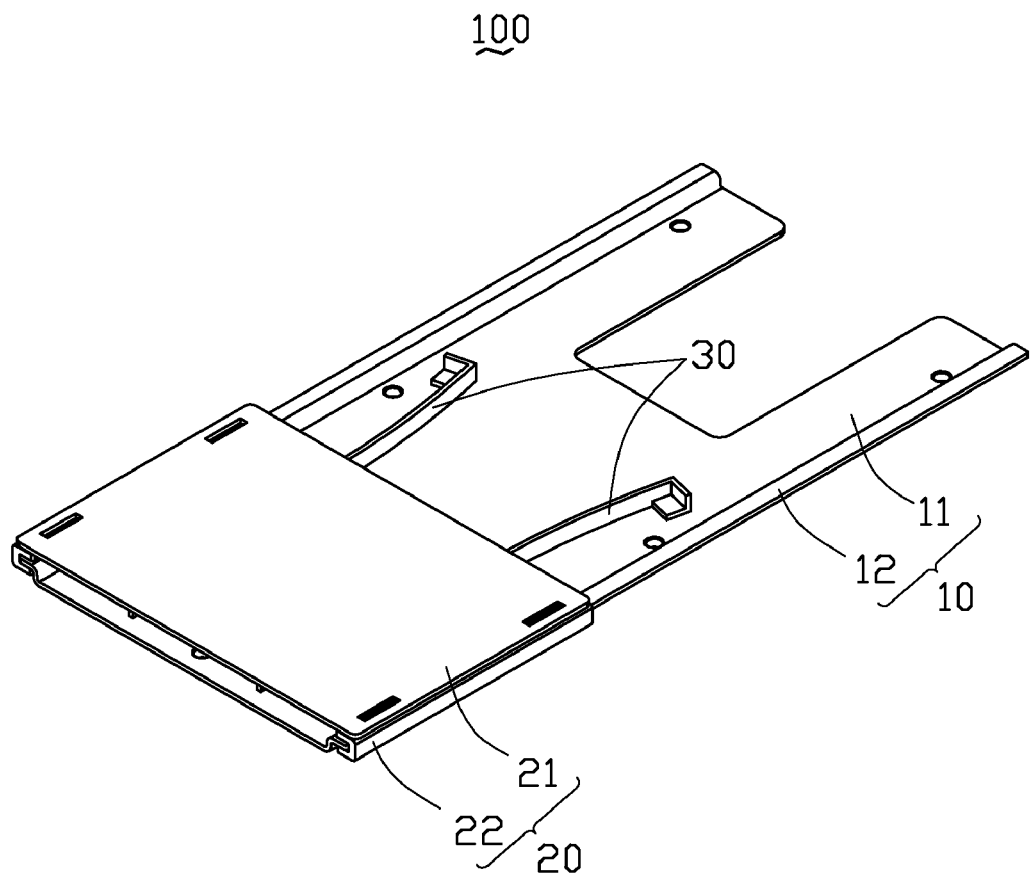
FIG. 1 is an isometric and assembled view of a slide mechanism according to an exemplary embodiment.

FIGS. 1 and 7 show an exemplary slide mechanism 100 used in a slide-type portable electronic device 300 such as a mobile phone, a personal digital assistant, and etc. The portable electronic device 300 includes a first housing 50 and a second housing 60 engaging with the first housing 50. The slide mechanism 100 generates an elastic force sufficient to slide the first and second housings 50 and 60 relative to each other. The first housing 50 has a keypad 52. The second housing 60 has a display 62 and several keys 64. The second housing 60 can slide lengthwise over the first housing 50, thus exposing or covering the keypad 32.

Figure 2:
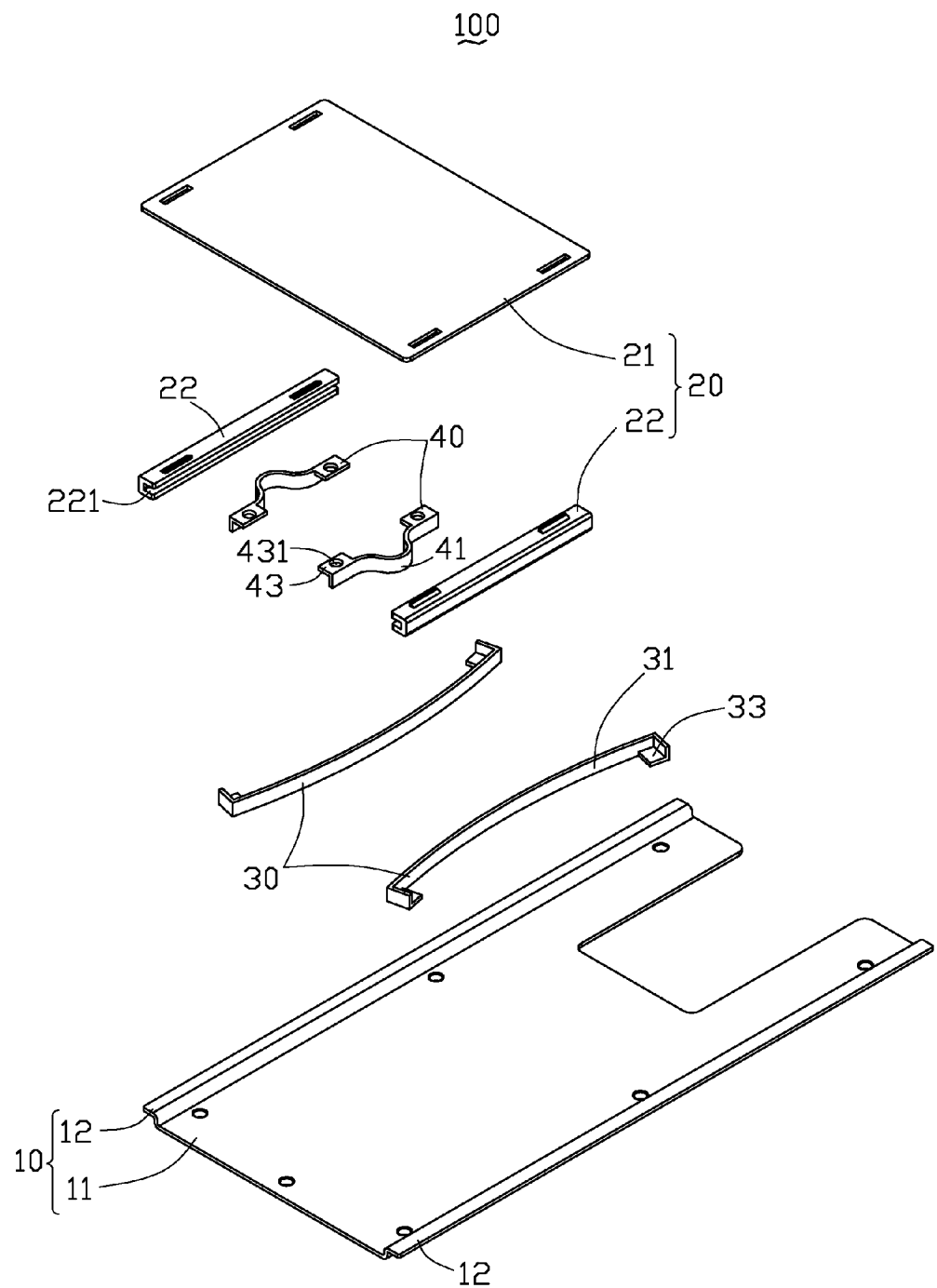
FIG. 2 is an exploded and isometric view of the slide mechanism illustrated in FIG 1.

Referring to FIG. 2, the slide mechanism 100 includes a main plate 10, a slide plate 20, two guiders 30 fixed to the main plate 10, and two sliders 40 fixed to the slide plate 20. The slide plate 20 and the main plate 10 are fixed to the second housing 60 and the first housing 50, respectively. The sliders 40 can slide along the guiders 30, thereby driving the sliding of the slide plate 20 relative to the main plate 10.

The main plate 10 includes a generally rectangular main base portion 11 and two generally L-shaped rail portions 12. Two opposite edge ends of the base portion 11 extend the two rail portions 12 upwardly. The slide plate 20 is shorter than the main plate 10. The slide plate 20 includes a generally rectangular slide base portion 21 and two slide portions 22. Two opposite borders of the slide base portion 21 directly fix the two slide portions 22 on a same side of the slide base portion 21. The two slide portions 22 are generally U-shaped bar defining two slide grooves 221 corresponding to the two rail portions 12.

The guiders 30 each have a generally arc-shaped guide portion 31 and two generally rectangular fixing portions 33. The guide portion 31 is an elastically deformable sheet. Two opposite ends of the guide portion 31 horizontally extend (e.g., co-molding) along the two fixing portions 33. The two fixing portions 33 are configured for fixing (e.g., hot-melting) the guider 30 to the main base portion 11.

The sliders 40 each have a curved slide portion 41 and two generally rectangular securing portions 43. The slide portion 41 is a deformable, arc-shaped, elastic sheet. Two opposite ends of the slide portion 41 horizontally extend (e.g., co-molding) along the two securing portions 43. The two securing portions 43 define two securing hole 431 configured for facilitating a fixing (e.g., hot-melting) of the slider 40 to the slide base portion 21.

Figure 3:
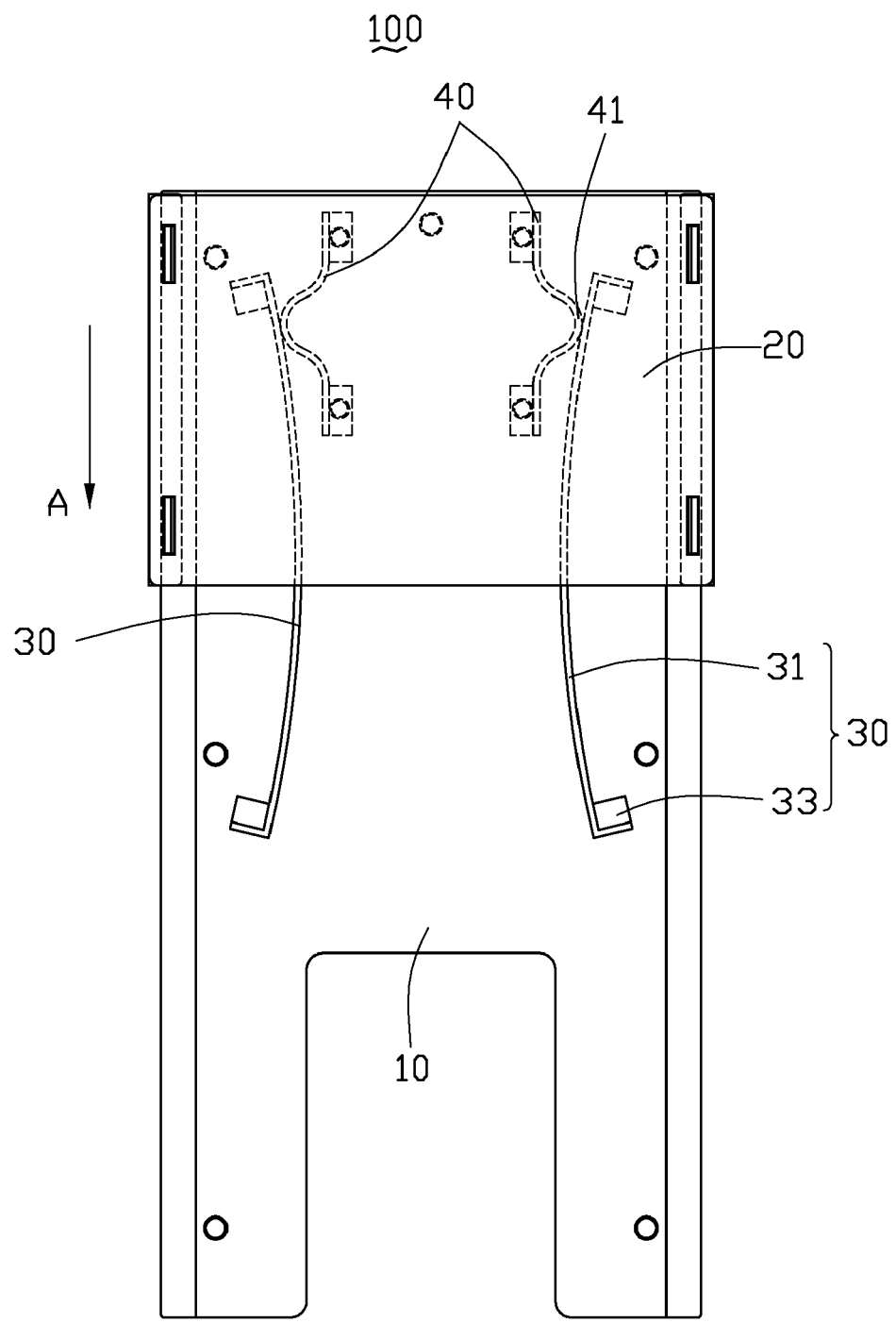
FIG. 3 is a perspective view of the slide mechanism illustrated in FIG. 1 at an opened position.

Referring to FIG. 3, when the slide mechanism 100 is assembled, the slide plate 20 covers a part of the main plate 10 and can slide along by the sliding of the slide portions 22 along the rail portions 12. The rail portions 12 are received in and can linearly slide within the slide grooves 221. The guiders 30 and the sliders 40 are located between the slide plate 20 and the main plate 10. The two guide portions 31 are systematically arranged on a surface of the main base portion 11 with one extending outward towards the other. There is a distance between the guide portions 31 and perpendicular to arrow line A. The distance is initially decreased along a direction designated by the arrow line A, minimized at the middle of the guide portions 31, and then increased further along the line A. The two sliders 40 are systematically arranged on a surface of the slide base portion 21. The sliders 40 face the guiders 30 and the slide portions 41 engage with the guide portions 31 without any compression generated between them. The sliders 40 are positioned between the guiders 30. At this time, the guide portions 31 and the slide portions 41 are at their original state. The slide mechanism 100 can be at an opened position and the portable electronic device 300 can be at an opened state accordingly.

Figure 5:
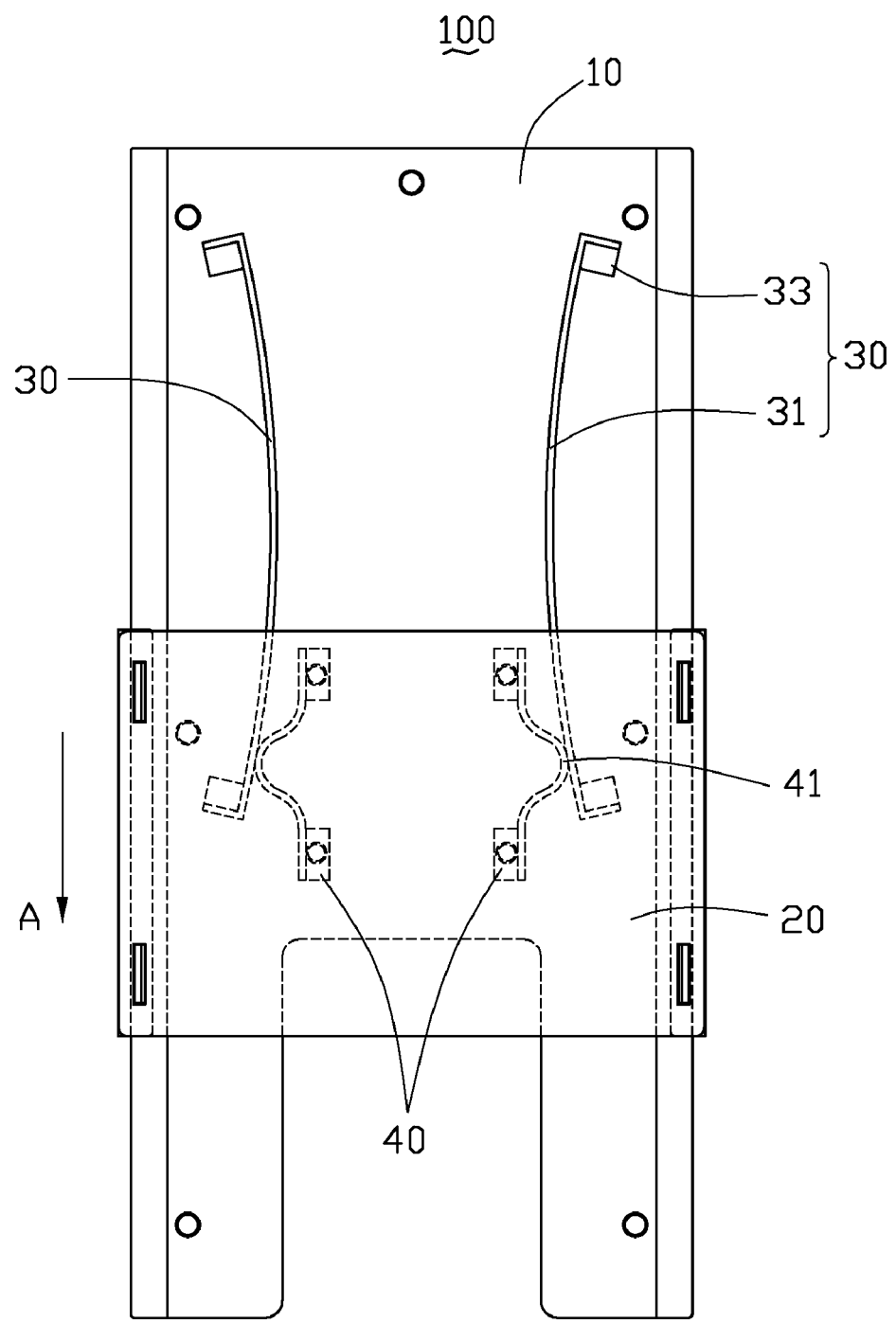
FIG. 5 is similar to FIG. 3, but at a closed position.
Figure 6:
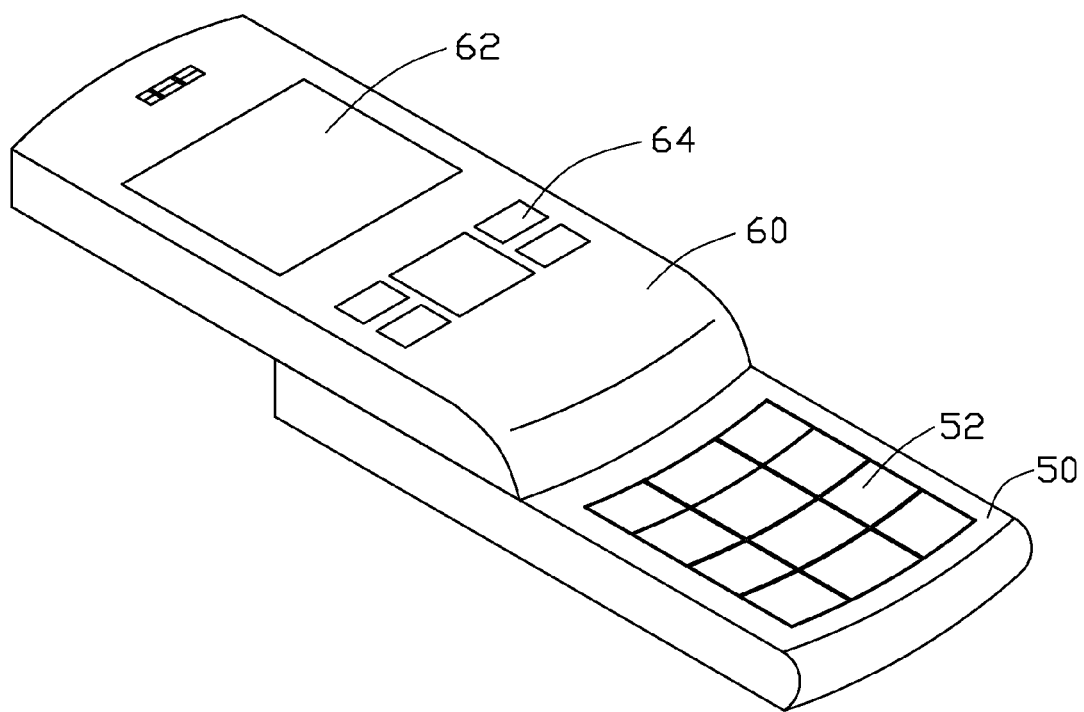
FIG. 6 is an isometric view of a portable electronic device at an opened state and using the slide mechanism.

Referring to FIG. 5, the slide mechanism 100 is at a closed position and the portable electronic device 300 is at a closed state. The slide plate 20 slides along the main plate 10 to reach the closed position to cover another part of the main plate 10. The second housing 60 covers the keypad 32. The slide portions 41 engage with the guide portions 31 without any compression generated between them.

Figure 4:
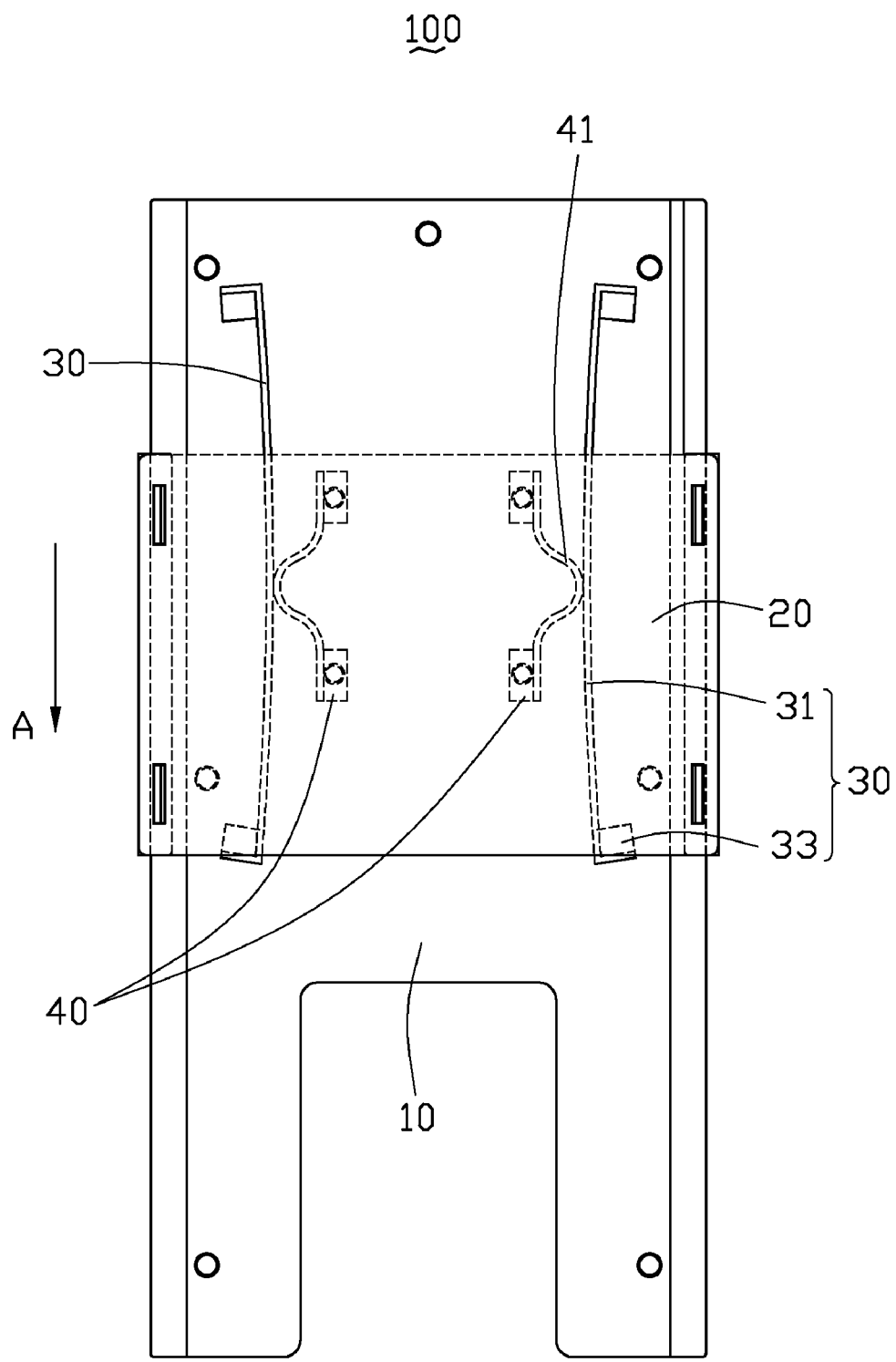
FIG. 4 is similar to FIG. 3, but at a critical position.

Referring back to FIG. 3, when the slide mechanism 100 is driven from the opened position to the closed position, the slide plate 20 slides along the main plate 10 by exerting an external force along line A. During this stage, the guide portions 31 and the slide portions 41 compress with each other. Referring to FIG. 4, the slide plate 20 reaches a critical position relative to the main plate 10. At this position, the guide portions 31 and the slide portions 41 are compressed with maximized deformations. After that, the slide plate 20 can further automatically slide towards the closed position by returning the guide portions 31 and the slide portions 41 from their compressed states to their original states.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide mechanism, comprising:
   a main plate;
   a slide plate installed on the main plate and slidable relative to the main plate;
   two sliders securely attached to the slide plate; and
   two guiders securely attached to the main plate and configured for deformably guiding the sliders to move therealong;
   wherein when the slide plate slides along the main plate, the sliders and the guiders compress each other, thereby generating deformations therebetween and driving the sliding of the slide plate along the main plate.

2. The slide mechanism as claimed in claim 1, wherein the sliders are positioned between the guiders.

3. The slide mechanism as claimed in claim 2, wherein:
   the sliders comprise elastic slide portions; and
   the guiders comprises elastic guide portions, the guide portions deformably guiding the sliders to move therealong, the guide portions and the slide portions compress each other to generate the deformations.

4. The slide mechanism as claimed in claim 3, wherein the slide portions are curved sheets, and the guide portions are arc-shaped sheets.

5. The slide mechanism as claimed in claim 3, wherein the sliders further comprise securing portions securing the sliders to the slide plate, and the guiders further comprise fixing portions fixing the guiders to the main plate.

6. The slide mechanism as claimed in claim 3, wherein the two guide portions are systematically arranged on the main plate with one extending outward towards the other.

7. The slide mechanism as claimed in claim 1, wherein the main plate comprises two rail portions, and the slide plate forms two slide portions, the slide portions sliding along the rail portions.

8. The slide mechanism as claimed in claim 7, wherein the slide portions define two slide grooves, the rail portions received in the slide grooves and configured for linearly sliding within the slide grooves.

9. A portable electronic device, comprising:
   a first housing;
   a second housing slidably installed on the first housing;
   a slide mechanism, comprising:
      a main plate;
      a slide plate installed on the main plate and slidable relative to the main plate;
      two sliders securely attached to the slide plate; and
      two guiders securely attached to the main plate and configured for deformably guiding the sliders to move therealong;
   wherein when the second housing slides relative to the first housing, the slide plate slides along the main plate, the sliders and the guiders compress each other, thereby generating deformations therebetween and driving the sliding of the second housing and the first housing.

10. The portable electronic device as claimed in claim 9, wherein the sliders are positioned between the guiders.

11. The portable electronic device as claimed in claim 10, wherein:
    the sliders comprise elastic slide portions; and
    the guiders comprises elastic guide portions, the guide portions deformably guiding the sliders to move therealong, the guide portions and the slide portions compress each other to generate the deformations.

12. The portable electronic device as claimed in claim 11, wherein the slide portions are curved sheets, and the guide portions are arc-shaped sheets.

13. The portable electronic device as claimed in claim 11, wherein the sliders further comprise securing portions securing the sliders to the slide plate, and the guiders further comprise fixing portions fixing the guiders to the main plate.

14. The portable electronic device as claimed in claim 11, wherein the two guide portions are systematically arranged on the main plate with one extending outward towards the other.

15. The portable electronic device as claimed in claim 9, wherein the main plate comprises two rail portions, and the slide plate forms two slide portions, the slide portions sliding along the rail portions.

16. The portable electronic device as claimed in claim 15, wherein the slide portions define two slide grooves, the rail portions received in the slide grooves and configured for linearly sliding within the slide grooves.

\* \* \* \* \*